United States Patent [19]

Yagasaki

[11] Patent Number: 4,660,847
[45] Date of Patent: Apr. 28, 1987

[54] MAIN STAND DEVICE FOR TWO-WHEELED MOTORCYCLE

[75] Inventor: Akio Yagasaki, Tokyo, Japan

[73] Assignee: Honda Giken Kogyo Kabushiki Kaisha, Tokyo, Japan

[21] Appl. No.: 762,062

[22] Filed: Aug. 2, 1985

[30] Foreign Application Priority Data

Aug. 8, 1984 [JP] Japan .................. 59-121540[U]

[51] Int. Cl.⁴ ............................................. B62H 1/02
[52] U.S. Cl. .................................................. 280/298
[58] Field of Search .............. 180/293, 298, 299, 300, 180/304, 766.1, 765.1; 254/418, 425, 424

[56] References Cited

U.S. PATENT DOCUMENTS

| | | | |
|---|---|---|---|
| 1,227,635 | 5/1917 | Lake | 280/293 |
| 4,067,543 | 1/1978 | Orth et al. | 254/425 |
| 4,432,562 | 2/1984 | Cline | 280/304 |
| 4,513,837 | 4/1985 | Archer | 280/293 |

FOREIGN PATENT DOCUMENTS 35-10415 9/1960 Japan .
36-1533 1/1961 Japan .

Primary Examiner—John A. Pekar
Attorney, Agent, or Firm—Lyon & Lyon

[57] ABSTRACT

A main stand device for a two-wheeled motorcycle having a body frame, which has a main stand pivotally secured to the body frame for rotation between a stored state and a standing state, an actuator operatively coupled with said main stand and operably provided on the body frame for manually rotating said main stand, the main stand having a stand body rotatably secured to the body frame and operatively coupled with the actuator and a leg telescopically mounted to the stand body and capable of being contacted with the ground, the stand body having a power unit for telescopically driving the leg, and a switch for operating the power unit being arranged so as to vary the switching mode in response to the operation of said actuator. Thus, this main stand device can stand a main stand with use of a small operating force in a short time by manually rotating the main stand at a predetermined angle and then slightly elongating the main stand by means of a power unit.

11 Claims, 9 Drawing Figures

MAIN STAND DEVICE FOR TWO-WHEELED MOTORCYCLE

BACKGROUND OF THE INVENTION

1. Field of the Invention

The present invention relates to a device which has a main stand secured to a body frame in a manner pivotable between a stored state and a standing state, and an actuator coupled operatively with the main stand and operably mounted at the body frame for allowing the main stand to be pivoted by a manual force.

2. Description of the Prior Art

In a conventional two-wheeled motorcycle such as a two-wheeled scooter, a body frame is entirely protected by a cover so that the presence of a main stand is unclear to driver and he or she may sometimes be at a loss how to reach the main stand for standing operation. To this end, Japanese Patent Publication Kokoku No. 14015/1960 and Japanese Utility Model Publication Kokoku No. 1533/1961 propose a device for standing a main stand by manually operating an actuator disposed at an evident position. In this prior art, a driver may not be at a loss how to reach the main stand, but if the two-wheeled motorcycle is heavy, a large operating force is required.

Another conventional technique is presented for mechanically operating a main stand by an electric motor. In this technique, (a) a main stand is rotated by the motor, (b) a main stand is elevationally moved upward and downward by the motor so as to lower and come into contact with the ground, or (c) a main stand is rotated by the motor at a predetermined angle and then elongated. However, in the technique (a), the rotating angle of the main stand is large, in the technique (b), the elongating stroke is large, and in the technique (c), two-stage motion is employed and inevitably induces use of a large-scale power unit for driving the main stand.

SUMMARY OF THE INVENTION

It is, therefore, an object of the present invention to provide a main stand device for a two-wheeled motorcycle which can eliminate the aforementioned drawbacks and disadvantages and can stand a main stand with use of a small operating force in a short time by manually rotating the main stand at a predetermined angle and then slightly elongating the main stand by a power unit.

According to the present invention, there is provided a main stand device for a two-wheeled motorcycle wherein a main stand is composed of a stand body operatively connected with an actuator rotatably supported on a body frame, and a leg telescopically mounted in the stand body so as to be engageable with the ground, wherein a power unit is provided on the stand body for telescopically driving the leg, and wherein a switch is arranged to vary its switching state in response to the operation of the actuator for operating the power unit.

The stand body is rotatable at a predetermined angle in response to the operation of the actuator, which rotation causes change in the switching state of the switch thereby to operate the power unit, elongating the leg in a slight stroke from the stand body and bringing the leg into contact with the ground to jack up the two-wheeled motorcycle.

The above and other advantages, features and additional objects of the present invention will become apparent by those skilled in the art from reading of the following detailed description of a embodiment in reference to the accompanying drawings.

DESCRIPTION OF THE PREFERRED EMBODIMENT

Figure 1:
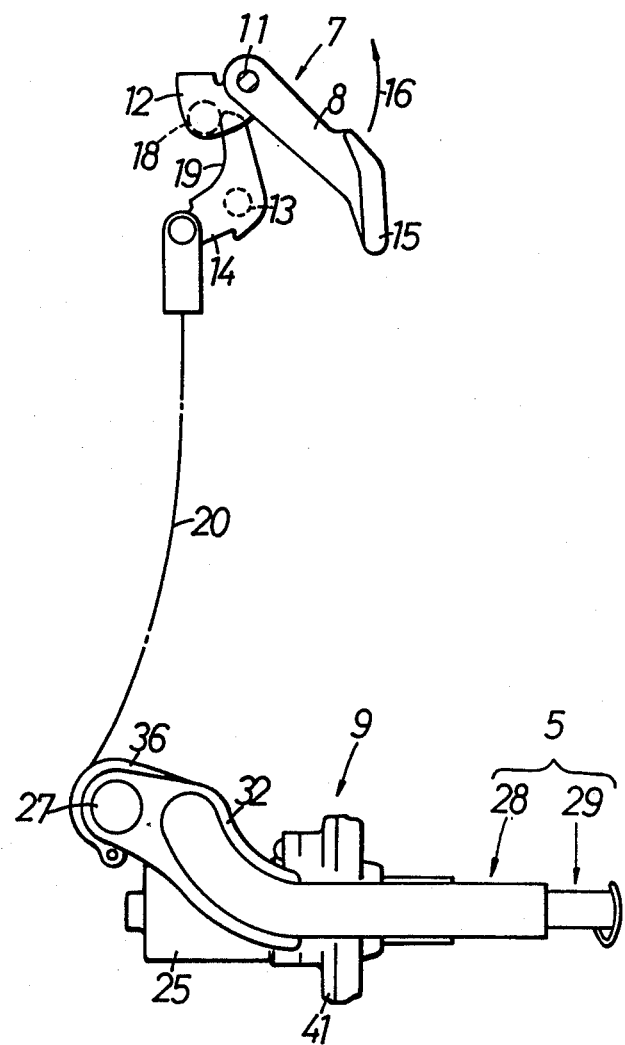
FIG. 1 is a side view of a simplified entire construction of a first embodiment of a main stand device for a two-wheeled motorcycle according to the present invention.
Figure 2:
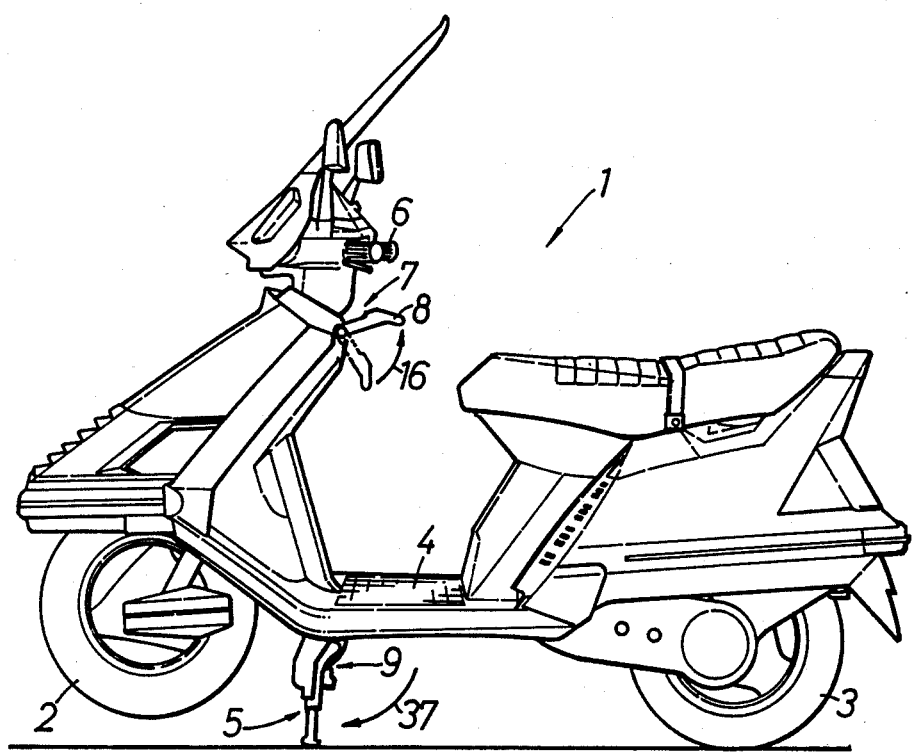
FIG. 2 is a side view of a scooter carrying the main stand device of the present invention.

Embodiment of the present invention will now be described in more detail with reference to the accompanying drawings. In FIGS. 1 and 2, showing one embodiment of the invention applied to a scooter, a main stand 5 is arranged in the vicinity of a front wheel 2 at the lower portion of a body frame 4 between the wheel 2 and a rear wheel 3 of a scooter 1 as a two-wheeled motorcycle. When the main stand 5 is stood, the scooter 1 is maintained in a stable stopped state with the rear wheel 3 being in contact with the ground, and the front wheel 2 being raised from the ground surface.

A drive unit 7 is disposed on the body frame 4 under a steering handle 6 at a position where a driver can readily manually operate the unit. The drive unit 7 and the main stand 5 are operatively coupled together. When an operating lever 8 as an actuator provided in the drive unit 7 is lifted as designated by an arrow, the main stand 5 is rotated at a predetermined angle and is slightly elongated by a drive force of a power unit 9, the scooter 1 is thus slightly raised as described above and held in the stopped state.

Figure 3:
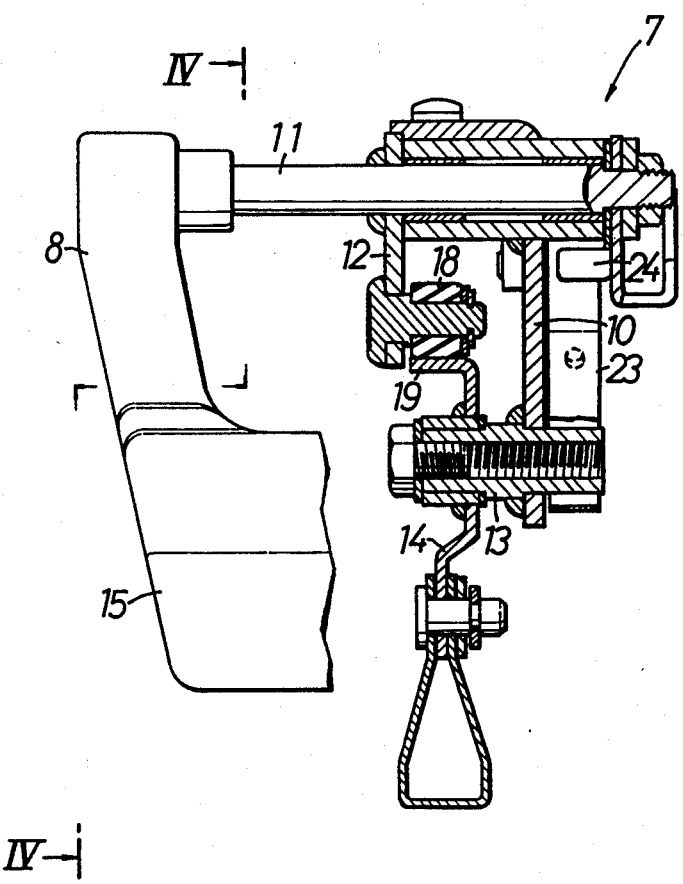
FIG. 3 is an enlarged longitudinal front view showing the construction of a drive unit of the main stand device.
Figure 4:
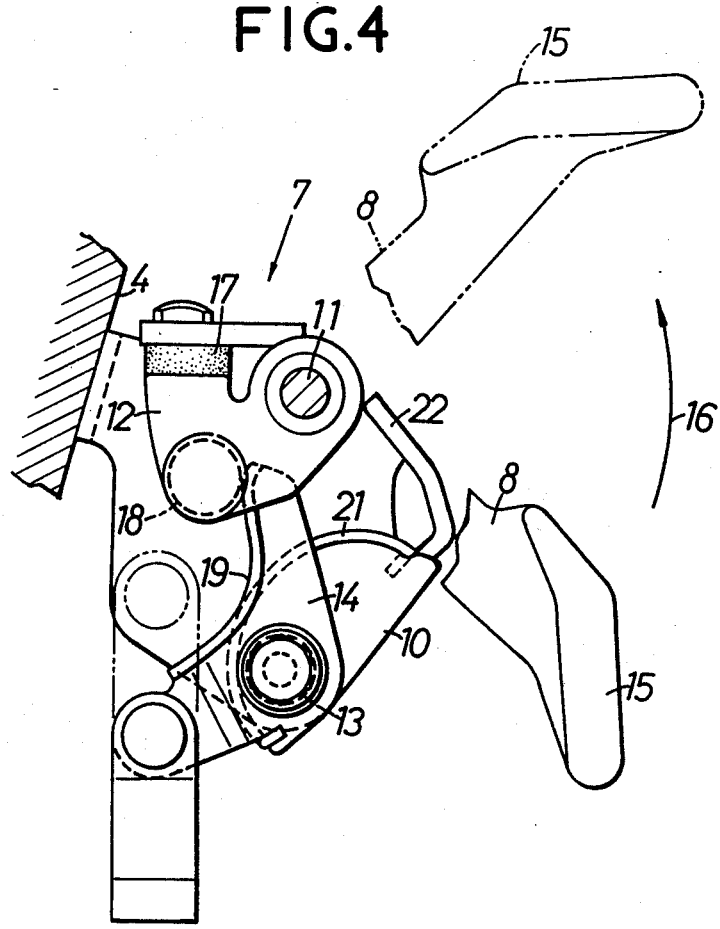
FIG. 4 is a longitudinal sectional view, taken along the line IV—IV of FIG. 3.
Figure 5:
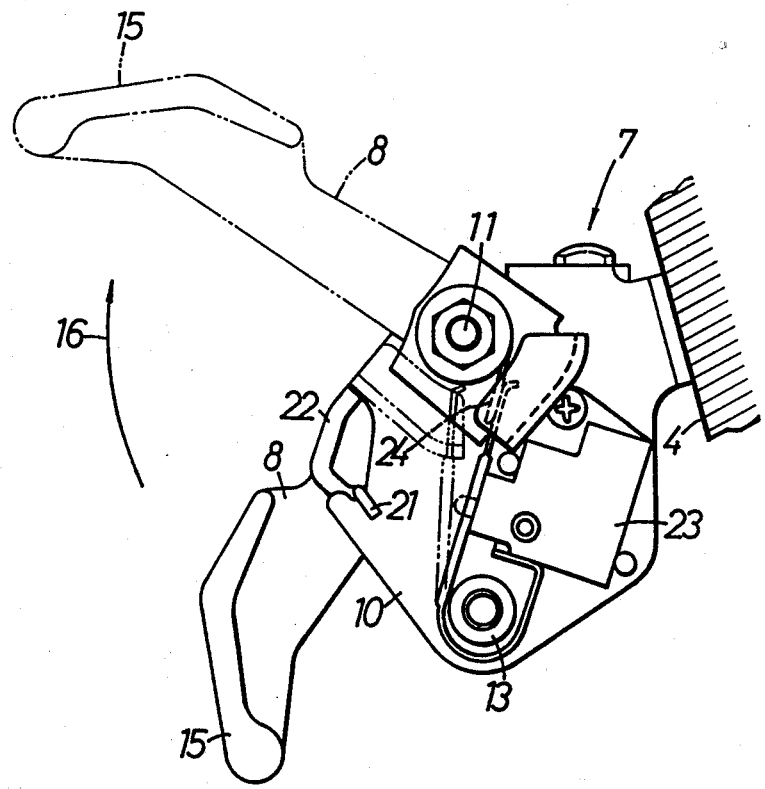
FIG. 5 is a right side view of FIG. 3.

In FIGS. 3, 4 and 5, the drive unit 7 comprises a supporting plate 10 fixedly secured to the body frame 4, a shaft 11 extending laterally of the scooter 1 and rotatably supported on the plate 10, operating lever 8 as an actuator secured to one end of the shaft 11, a sub lever 12 fixed to an intermediate portion of the shaft 11, and a link arm 14 pivotally secured by a pivotal shaft 13 provided on the plate 10 in parallel with the shaft 11.

The lever 8 is extended from the shaft 11 along the longitudinal direction of the scooter 1 toward the rear side, and a grip 15 to be grasped by a hand is formed at the movable end of the lever 8. The lever 8 is rotatable between a stored position of the stand as designated by solid lines and a standing position as designated by chain lines in FIGS. 4 and 5. By operating the lever 8 in the rotating direction 16 from the stored position toward the standing position, the standing operation of the main stand 5 is effected.

The sub lever 12 is fixedly secured to the shaft 11 at a predetermined angle to the lever 8. When the lever 8 is located at the stand-stored position, the lever 12 is placed in contact with an elastic stopper 17 secured to the plate 10. A roller 18 having an axis parallel to the shaft 11 is rotatably supported to the lever 12.

A link arm 14 is formed fundamentally in an arcuate shape, and rotatably supported at its center on the shaft 13. An abutting portion 19 is provided along the inner peripheral edge of the arm 14, and the roller 18 is abutted against the abutting portion 19 at one end of the arm 14. A stand cable 20 for manually rotating the main stand 5 is coupled with the other end of the arm 14. A crescent-shaped spring 21 is interposed between the plate 10 and the arm 14 to rotatably urge the arm 14 in a direction that the abutting portion 19 is abutted against the roller 18. Thus, when the lever 8 is disposed at the stand-stored position, the lever 8 is prevented from rocking due to the vibration of the body frame 4 and the like.

When the lever 8 is rotated from the stand-stored state in the rotating direction 16, the sub lever 12 is rotated also in the rotating direction 16 in response thereto, and the arm 14 is pressed by the roller 18 to rotate clockwise in FIG. 4 while towing the stand cable 20.

Figure 6:
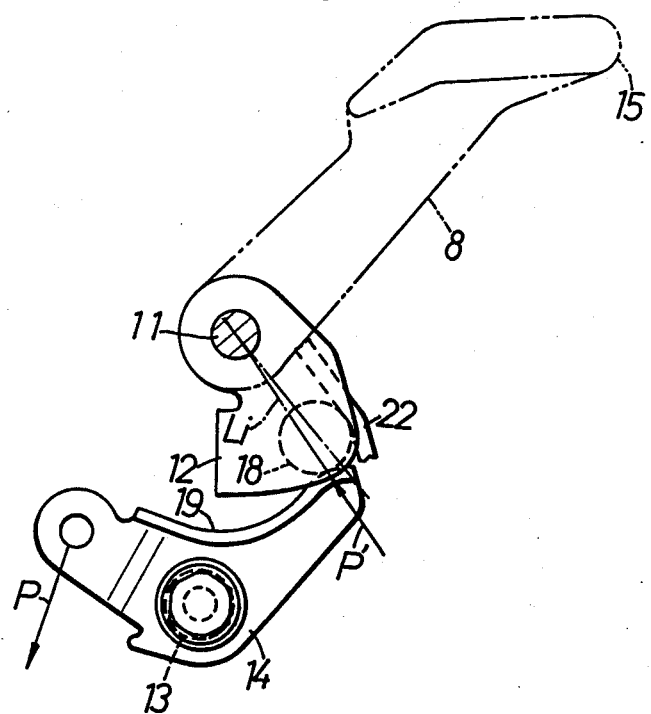
FIG. 6 is a simplified view showing the structure for maintaining the operating lever in a state to rise the stand.

In FIG. 6, the link arm 14 is pressed by the roller 18 and rotated. When a reaction force P' is caused by the tension P of the cable 20 on an imaginary line Li coupling both the centers of the roller 18 and the shaft 11, the moment applied from the arm 14 to the lever 8 through the sub lever 12 becomes zero. When the lever 8 is further pulled up, a force acts from the arm 14 to the lever 12 in counterclockwise direction in FIG. 4 due to the reaction force P'. A stopper 22 to be abutted against the roller 18 is provided at the plate 10. When the lever 8 is rotated until the roller 18 is abutted against the stopper 22, the lever 8 can be maintained in a position holding the stand at its standing state due to the roller 18 being pressed by the arm 14 toward the stopper 22 side as described above, even if the driver takes off his hand from the lever 8.

A switch 23 is fixedly arranged on the side of the plate 10 oppositely from the arm 14, and a pressing member 24 for varying the switching state of the switch 23 is fixedly secured to the other end of the shaft 11. The switch 23 serves to operate a motor 25 (in FIG. 1) contained in the power unit 9. The switch 23 is pressed by the member 24 when the lever 8 is in a stand-stored state. The operation of the motor 25 is stopped in this state. When the lever 8 is rotated from the stand-stored state to the stand-stood position, the member 24 is separated from the switch 23, and the motor 25 starts normally rotating. When the lever 8 is returned from the standstood position to the stand-stored state, the member 24 presses the switch 23, thereby the motor 25 starting its reverse operation.

Figure 7:
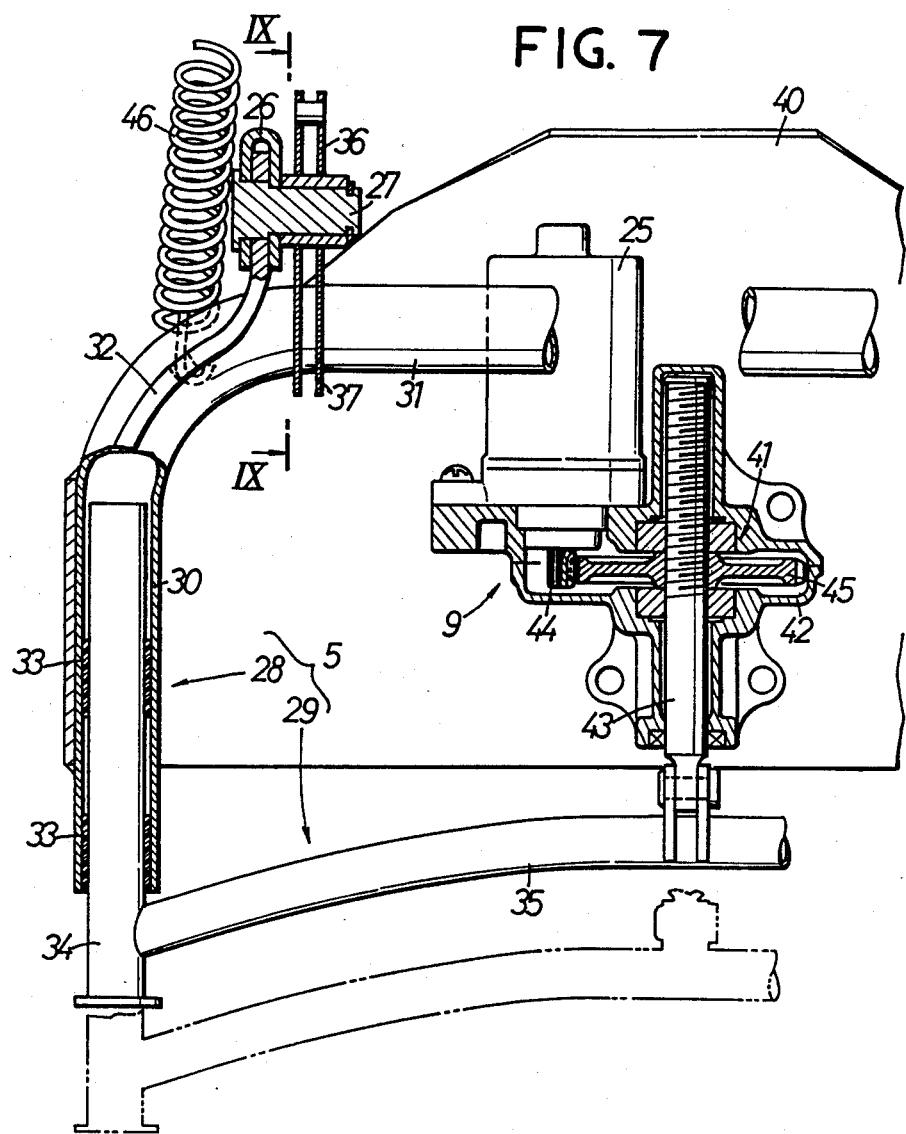
FIG. 7 is an enlarged fragmentary plan view showing the main stand and the power unit.
Figure 8:
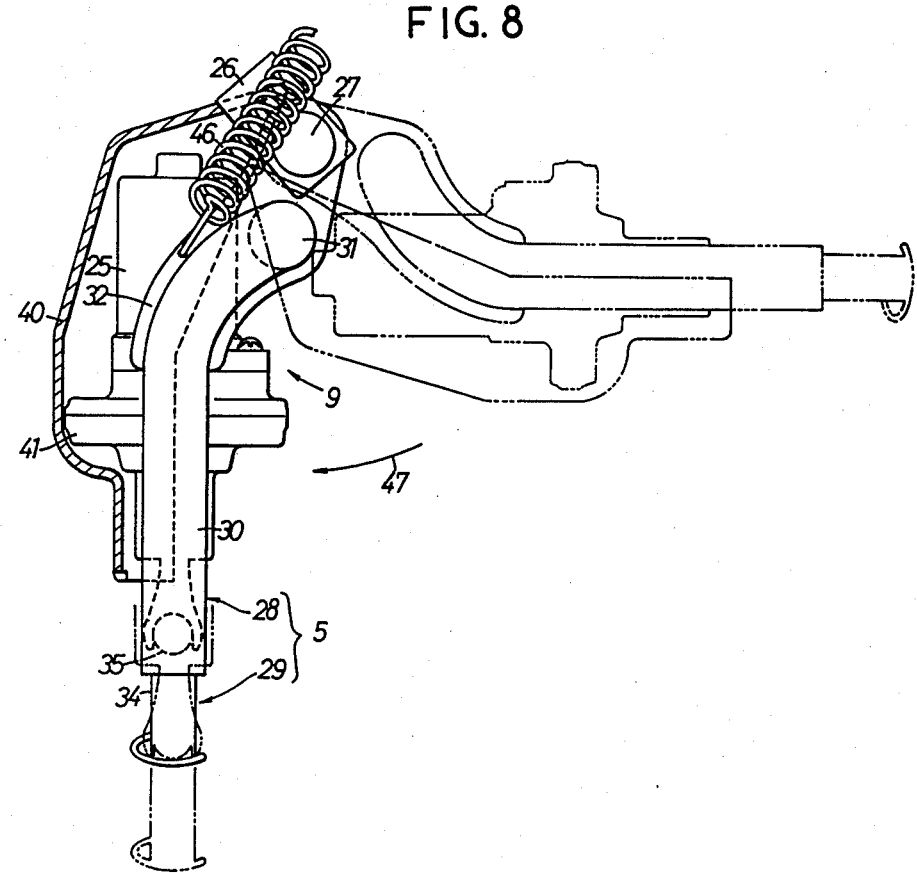
FIG. 8 is an enlarged side view of the main stand and the power unit.
Figure 9:
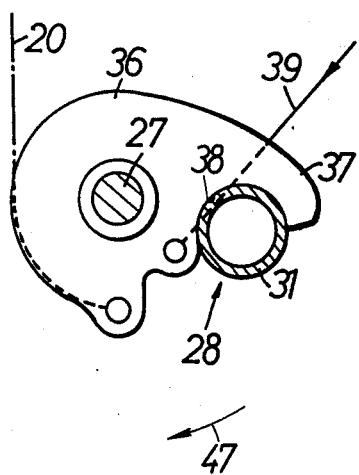
FIG. 9 is a sectional view, taken along the line IX—IX of FIG. 7.

In FIGS. 7, 8 and 9, rotational shafts 27 extending substantially horizontally in a direction perpendicular to the longitudinal direction of the scooter 1 are fixedly supported on a pair of brackets 26 secured to the body frame 4, and the main stand 5 is rotated around the shafts 27 serving as a fulcrum.

The main stand 5 has a stand body 28, and a leg 29 telescopically mounted in the stand body 28. The stand body 28 is constructed by bending a pipe into U-shaped with a pair of parallel parts 30 coupled through a coupler 31, and the coupler 31 is disposed in parallel with the shaft 27. Supporting arms 32 secured to the parallel parts 30 are clamped between brackets 26, 26 and rotatably supported on the shafts 27. Thus, the stand body 28 is rotatable around the shafts 27 as a fulcrum.

The leg 29 is composed by coupling a pair of posts 34 via a coupling rod 35, these posts being movably inserted into the parallel parts 30 of the stand body 28 through bearing bushings 33.

A cable disc 36 is secured to one shaft 27, the stand cable 20 extending from the drive unit 7 is wound around the outer periphery of the disc 36 and is coupled at its one end to the disc 36. The winding direction of the cable 20 around the disc 36 is set so that the disc 36 rotates in the same direction as the standing direction 47 of the main stand 5 when the cable 20 is pulled upwards by the drive unit 7. A connector 38 to be engaged with the rear side of one end of the coupler 31 along the standing direction 47 is integrally provided on the disc 36. Thus, when the stand cable 20 is lifted by the drive unit 7, the main stand 5 is rotated in the standing direction 47 through the disc 36.

A packing cable 39 is coupled with the disc 36 in such a manner that when the cable 20 is towed to rotate the disc 36, that rotation causes the cable 39 to be pulled. The cable 39 is coupled with a parking locking mechanism (not shown) for stopping the operation of a transmission (not shown), and the parking locking mechanism is operated by towing the cable 39 through the disc 36. A protective plate 40 is fixed to the body 28 of the stand 5 so as to cover the lower portion of the stand 5 when the stand 5 is stored in the body frame 4, and the power unit 9 is fixedly supported on the plate 40.

The power unit 9 consists of the motor 25 and a converting mechanism 41 for converting the rotary power of the motor 25 to the telescopic motion of the leg 29. The converting mechanism 41 comprises a threaded rod 43 supported in the casing 41 against rotation but in an axially slidable manner and coupled with the connecting rod 35, and a reduction gear 45 screw-threaded on a midway portion of the threaded rod 43 and placed in mesh with an output gear 44 formed on the output shaft of the motor 25. The gear 45 is held immovable in the axial direction, and so the rod 43 is advanced and retracted in response to the operation of the motor 25. Further, the gear 45 and rod 43 are engaged with each other such that when the motor 25 is normally rotated, the rod 43 is advanced whereas when the motor 25 is reversely rotated, the rod 43 is retracted.

A spring 46 is extended between the supporting arm 32 and the body frame 4, and the main stand 5 is rotatably urged reversely to the standing direction 47 by the tension of the spring 46.

The operation of this embodiment will be described. When the main stand 5 is located in the stored state, the lever 8 of the drive unit 7 is placed at the lowermost position, and the power unit 9 is not operated, and the leg 29 of the main stand 5 is retracted into the stand body 28. When the operating lever 8 is rotated in the rotating direction 16 in order to stand the main stand 5, the cable 20 is pulled upwards by the link arm 14. Thus, the cable disc 36 is rotated, and the main stand 5 is rotated from the stored state in the standing direction 47 as required.

When the operating lever 8 is rotated to the upper stand erecting position, the main stand 5 is in the substantially vertical state with respect to the ground as shown in FIG. 8, and the motor 25 is started to rotate in the normal direction in the course of rotating operation of the lever 8. Thus, the rod 43 is moved forward, and the leg 29 is extended from the stand body 28. Even after the posts 34 of the leg 29 come in contact with the ground, the elongating operation of the leg 29 is continued. The motor 25 stops its normal rotating operation in the state where the scooter 1 is slightly raised up by the main stand 5, whereby the main stand 5 is maintained in its standing state.

In order to release the standing state of the main stand 5, it is only required to return the lever 8 to the original position. Together with this returning operation, the reverse operation of the motor 25 is started, and the leg 29 is moved backward into the stand body 28. Then, the main stand 5 is released from the ground surface and returned to the stored state by the tension of the spring 46, and the scooter 1 can run.

In the embodiments described above, the scooter 1 is used as a two-wheeled motorcycle. However, the present invention is not limited to the disclosed embodiments. This invention can be widely applied to any other types of motorcycles.

According to the present invention as described above, the main stand is composed of the stand body operatively coupled with the actuator rotatably supported on the body frame, and a leg telescopically mounted to the stand body to be engageable with the ground; the power unit for telescopically driving the leg is provided at the stand body; and the switch for operating the power unit is arranged to vary its switching state in response to the operation of the actuator. Therefore, after the main stand is manually rotated at a predetermined angle, the main stand can be slightly elongated by the power unit and can be brought into a standing state with use of a small operating force in a short time. Since the elongating stroke of the main stand is short, the power unit can be reduced in size.

What is claimed is:

1. A main stand device for a two-wheeled motorcycle having a body frame, comprising:
    a main stand rotatably secured to the body frame for rotation between a stored state and a standing state,
    an actuator operatively coupled with said main stand and pivotally mounted on the body frame, said actuator being manually operable to pivot said main stand,
    said main stand including a stand body rotatably supported on the body frame and operatively coupled with said actuator and a leg telescopically mounted to said stand body and capable of extending to the ground, said stand body having a power unit provided thereon for telescopically driving the leg, and a switch means for operating the power unit being arranged so as to vary a switching mode in response to operation of said actuator, said switch means actuating the power unit when said actuator is pivoted a predetermined angle in a stand-erecting direction.

2. A main stand device for a two-wheeled motorcycle having a body frame, comprising:
    a main stand mounted to the frame for rotation between a stored position and a standing operative position and including a pair of parallel spaced parts integrally connected by a lateral coupler and a leg with a pair of posts mounted to the respective parallel parts in a manner extendiable and retractable relative thereto;
    an actuator disposed on the frame for manual rotative operation;
    a link mechanism associated with said actuator and transmitting rotative movements of the actuator via a cable to said main stand for rotation of the latter;
    a power unit operable to drive the pair of posts for extending and retracting movements; and
    a switch mechanism connected to said power unit and adapted to detect rotation of said actuator more than a predetermined angle, said switch mechanism placing the power unit in an operative state upon detection of the actuator having been rotated more than said predetermined angle.

3. A main stand device as claimed in claim 2, wherein the power unit is adapted to drive the pair of posts in an extending direction when the main stand is being rotated toward said standing position whereas to drive the posts in a retracting direction when the main stand is being rotated toward said stored position.

4. A main stand device as claimed in claim 3, wherein a member is provided on said actuator for integral rotation therewith, said member changing the switching mode of the switch mechanism with a boundary on said predetermined angle of rotation of the actuator.

5. A main stand device as claimed in claim 4, wherein said pair of posts are connected together by a laterally extending coupled rod, to an axailly midway portion of the coupling rod is connected a threaded rod, said threaded rod being axially movable by a force of the power unit transmitted through a gear mechanism.

6. A main stand device as claimed in claim 4, further comprising a protective plate on the frame forward of the main stand.

7. A main stand device as claimed in claim 4, further comprising a protective plate on the frame forward of the main stand.

8. A main stand device as claimed in claim 3, wherein said power unit is mounted on the main stand for integral rotation.

9. A main stand device as claimed in claim 2, wherein a member is provided on said actuator for integral rotation therewith, said member changing the switching mode of the switch mechanism with a boundary on said predetermined angle of rotation of the actuator.

10. A main stand device as claimed in claim 2, wherein said power unit is mounted on the main stand for integral rotation.

11. A main stand device as claimed in claim 2, wherein said link mechanism includes a sub lever integrally rotatable with said actuator, a link arm in operative with said sub lever and connected with one of opposite ends of the cable for converting rotating motion of the sub lever into reciprocating motion of the cable, and a disc rotatable on the frame and connected with the other end of the cable, said disc being engaged with said coupler of the main stand to transmit reciprocating motion of the cable to said main stand as a rotating motion.

* * * * *

UNITED STATES PATENT AND TRADEMARK OFFICE
CERTIFICATE OF CORRECTION

PATENT NO. : 4,660,847
DATED : April 28, 1987
INVENTOR(S) : Akio Yagasaki

It is certified that error appears in the above-identified patent and that said Letters Patent are hereby corrected as shown below:

In column 6, line 55, after the word "-tive" and before the word "with" insert -- connection --.

In column 6, line 39, correct "4" to read -- 5 --.

Signed and Sealed this

Twenty-fourth Day of May, 1988

Attest:

DONALD J. QUIGG

*Attesting Officer*   *Commissioner of Patents and Trademarks*